United States Patent
Inoue

[15] 3,692,137
[45] Sept. 19, 1972

[54] VEHICLE POWER STEERING CONTROL DEVICE

[72] Inventor: Naohiko Inoue, Yokohama, Japan

[73] Assignee: Nissan Motor Company, Ltd., Yokohama, Japan

[22] Filed: May 11, 1971

[21] Appl. No.: 142,216

[30] Foreign Application Priority Data

Aug. 6, 1970 Japan ................45/68296

[52] U.S. Cl. ............180/79.2 R, 60/52 S, 91/434, 137/625.61, 137/625.66
[51] Int. Cl. .................................B62d 5/08
[58] Field of Search......180/79.2 R; 60/52 S; 91/370, 91/371, 372, 373, 434; 137/625.61, 625.66

[56] References Cited

UNITED STATES PATENTS

| | | | |
|---|---|---|---|
| 2,748,881 | 6/1956 | Holley | 180/79.2 R |
| 2,824,550 | 2/1958 | Gribler et al. | 91/434 X |
| 2,893,504 | 7/1959 | Jackson | 180/79.2 R |
| 2,896,588 | 7/1959 | Hayner et al. | 137/625.61 |
| 2,922,440 | 1/1960 | Hardy et al. | 91/434 X |
| 3,465,842 | 9/1969 | Hruska | 180/79.2 R |

Primary Examiner—Benjamin Hersh
Assistant Examiner—Leslie J. Paperner
Attorney—John Lezdey

[57] ABSTRACT

A vehicle power steering control device including a reaction assembly which applies a reaction force on the steering wheel that depends on both steering effort and vehicle speed. The device comprises a vehicle speed-responsive modulator valve adapted to control pressure in a reaction chamber transmitted from a fluid pump. Since the pressure from the fluid pump is proportional to steering effort on the power cylinder, the modulated pressure in the reaction chamber depends on both steering effort and vehicle speed and gives rise to a corresponding reaction applied on the steering wheel. The modulator valve is arranged to reduce the pressure in the reaction chamber in accordance with the decrease in vehicle speed. Thus, for low vehicle speeds, the driver encounters a small resistance in turning the steering wheel and, on the other hand for high vehicle speeds, a large turning resistance is provided to avoid the danger of too rapid turning of the steering wheel and road wheels.

7 Claims, 5 Drawing Figures 3,692,137

VEHICLE POWER STEERING CONTROL DEVICE

Heretofore, various types of hydraulic power steering devices have been developed for use on vehicles. In certain of them, a hydraulic reaction assembly is provided for applying a reaction on the steering wheel that is proportional to steering efforts so that the vehicle driver is always aware of variations in steering effort. Thus, if a large steering effort is required to make a turn, he encounters a great resistance in turning the steering wheel. However, in devices of this type, the driver has no steering while feel driving, since the reaction applied by the reaction assembly is independent of vehicle speed. Therefore, it has been desired to have the reaction varied in accordance with vehicle speed such that the resistance in turning the steering wheel increases with vehicle speed. According to this invention, the hydraulic power steering device includes a modulator valve which, in response to vehicle speed, controls or modulates the pressure in a reaction chamber transmitted from a fluid pump that is proportional to steering effort. The modulated pressure in the reaction chamber gives rise to a corresponding reaction applied on the steering wheel.

It is therefore an object of this invention to provide a vehicle power steering control device which can provide a proper reaction on the steering wheel that is dependent on vehicle speed as well as steering effort.

It is another object of this invention to provide a vehicle power steering control device incorporating a modulator valve which operates to control pressure in the reaction chamber in accordance with vehicle speed.

It is a further object of this invention to provide a power steering control device which is simple to construct and reliable in operation.

Figure 1:
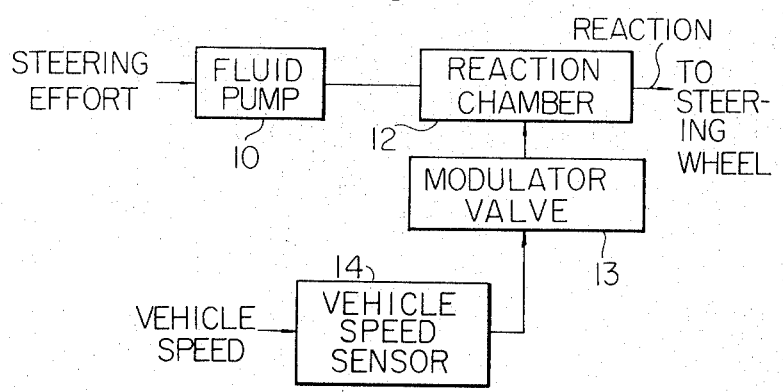
FIG. 1 is a block diagram of a vehicle power steering control device of this invention.

Referring to the drawings and more particularly to FIG. 1, there is shown a vehicle power steering control device of this invention which is generally of the linkage type. Since the power operating portions of the device do not constitute a part of this invention, they have been omitted for the purpose of simplicity. In the Figure, reference numeral 10 designates an engine driven fluid pump adapted to provide hydraulic pressure to a power cylinder (not shown) through a control valve 11 (shown in FIG. 2). The hydraulic pressure from the fluid pump 10, which is proportional to steering effort on the power cylinder, is also supplied to a reaction chamber 12 provided in the control valve 11. A modulator valve 13 is provided integral with the control valve 11 and is responsive to vehicle speed to control pressure in the reaction chamber 12, so that it senses both steering effort and vehicle speed. The modulator valve 13 receives a vehicle speed signal from a conventional electric or hydraulic vehicle speed sensor 14. The reaction chamber pressure thus regulated acts on the control valve 11 to apply a reaction on the steering wheel (not shown) that corresponds generally to the pressure which is related to vehicle speed as well as steering effort. It is to be noted that the modulator valve 13 is so constructed as to reduce the reaction chamber pressure in proportion to the decrease in vehicle speed. Thus, for low vehicle speeds, the driver encounters a small resistance in turning the steering wheel and, on the other hand, for high speeds, a greater turning resistance is provided to minimize the danger of too rapid turning of the steering wheel and the road wheels.

Figure 2:
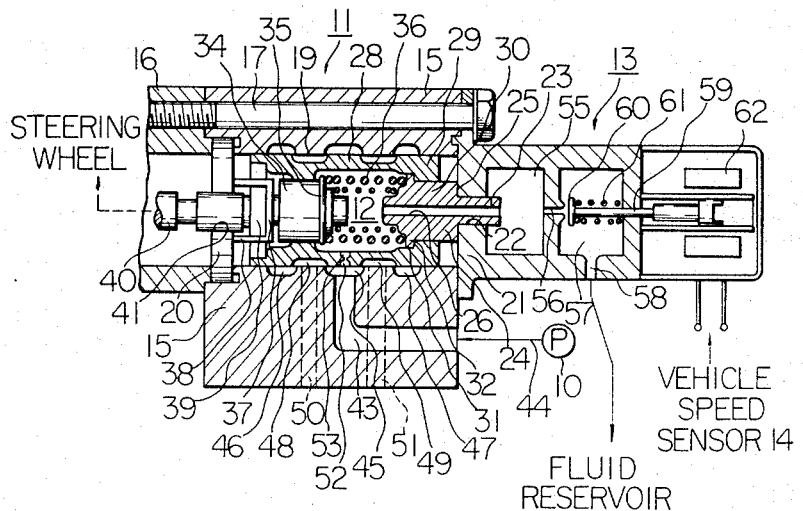
FIG. 2 is a schematic longitudinal section view of a control valve and modulator valve of this invention.

In FIg. 2, there is illustrated the general construction of the control valve 11 and the modulator valve 13 of this invention. The control valve 11 includes a valve body 15 fixedly supported in a partially shown shifter housing 16 by means of a bolt 17, which housing in turn is securely mounted on a cross rod (not shown). Although not shown, a pair of steering links are suitably connected with the cross rod so that axial movement of the valve body 15 will cause a pair of ground-engaging wheels to turn.

The valve body 15 is provided with a longitudinal central bore 19, one end of which is closed by a closure member 20 disposed between the valve body 15 and the shifter housing 16. The opposite end of the bore 19 is closed by means of another closure member 21 which is fixedly supported against the end wall of the valve body 15 by the bolt 17. The closure member 21, which forms part of the modulator valve 13, is formed with a central bore 22 adapted to slidably receive a small diameter portion 23 of a spring seat 24. The spring seat 24 has a shoulder 25 acting as a stopper, which is normally in abutment with the inner wall of the closure member 21. The spring seat 24 is also formed with an axial passageway 26.

A hollow valve spool 28 is slidably mounted in the valve body bore 19 and has its right-hand end portion 29 slidably receiving therein a large diameter portion 30 of the spring seat 24. An annular notch 31 is internally formed near the right-hand end of the valve spool 28 to slidably receive a stopper flange of the spring seat 24. With this arrangement, movement of the valve spool 28 in a leftward direction as viewed in FIG. 2 causes the spring seat 24 to move in the same direction.

Another spring seat 34 is slidably mounted in the valve spool 28 and has a flange 35 acting as a stopper. The reaction chamber 12 is in the valve spool 28 between the spring seats 24 and 34, in which a plurality of coiled springs 36 are so preloaded as to urge the spring seats 24 and 34 away from each other. Positioned on the left-hand side of the spring seat 34 is a pedestal 37 provided with a plurality of legs 38 which slidably extend through openings formed in a plug 39 integrally formed with the valve spool 28. The legs 38 of the pedestal 37 are adapted to rest upon the inner wall of the closure member 20. An operating rod 40 which is operatively associated with the steering wheel (not shown) slidably extends through an opening 41 centrally formed in the closure member 20, and is operatively connected with the plug member 39 so as to move the valve spool 28.

The valve body 15 is provided with a fluid inlet passage 43 which is adapted to be connected by a conduit 44 with the fluid or oil pump 10 so that fluid under pressure will flow from the pump 10 into the first passage 43. The passage 43 communicates at its outlet end with a first annular groove 45 formed in the valve body bore 19. Also provided in the valve body 15 on both sides of the annular groove 45 are annular second and third grooves 46 and 47, respectively, which are adapted to be connected by suitable second and third passages (not shown) with a fluid reservoir or sump (not shown). These annular grooves 46 and 47 have the same width and are equally spaced from the annular groove 45.

The valve spool 28 is provided with a pair of spaced fourth and fifth annular grooves 48 and 49, respectively, in the outer wall thereof which are adapted to communicate with fourth and fifth passages 50 and 51, respectively, provided in the valve body 15 which passages in turn lead to opposite ends of a power cylinder having a piston and a rod (not shown). The valve spool 28 is also provided with a passage 52 having an orifice 53 therein, which is adapted to communicate the pressure passage 43 with the reaction chamber 12.

In the operation of the control valve 11 shown in FIG. 2, when the operating rod 40 is moved to the right by rotation of the steering wheel, the valve spool 28 also is moved to the right causing the spring seat 34 to move in the same direction and to further compress the coiled springs 36. This spool movement will also cause the pressure passage 43 to communicate with the left-hand groove 48 of the valve spool 28 while the groove 48 is isolated from the groove 46 leading to the fluid reservoir. Thus, fluid under pressure flows through the passage 50 into the cylinder on the left-hand side of the piston, causing it to move to the right. It follows that the valve body 15 is moved to the right, so that the vehicle wheels are caused to turn to the left. When, on the other hand, the valve spool 28 moves to the left, the spring seat 24 is moved with the valve spool 28 in the same direction, further compressing the coiled springs 36. Thus, the right-hand groove 49 of the valve spool 28 is communicated with the pressure passage 43 and is simultaneously isolated from the groove 47 leading to the fluid reservoir. As a result, fluid under pressure will flow through the passage 51 into the cylinder on the right-hand side of the piston, moving it to the left. This causes the valve body 15 to move to the left the vehicle wheels are caused to turn to the right.

As shown in FIG. 2, the modulator valve 13 is securely mounted on the right-hand end wall of the control valve 11. The modulator valve 13 is of the poppet type and includes a pressure control chamber 55 communicating through the passageway 26 with the reaction chamber 12. The pressure control chamber 55 has a pressure-modulating port 56 opening to another chamber 57 which in turn communicates through a drain port 58 with the fluid reservoir. A plunger 59 is provided with its head or tip 60 facing the pressure-modulating port 56 so as to close it. The plunger 59 has a coiled spring 61 therearound and is axially movable by energization of a solenoid coil 62 which is adapted to be connected to the vehicle speed sensor 14 (not shown). The vehicle speed sensor 14 is, for example, of the conventional type comprising an a.c. generator the rotor of which is drivably connected with the transmission output shaft to produce an a.c. current proportional to vehicle speed. The a.c. current thus obtained is converted into a d.c. current proportional to vehicle speed and is applied to the solenoid coil 62. The coiled spring 61 is so preloaded as to urge the plunger 59 to close the pressure-modulating port 56. The solenoid coil 62 is also arranged to apply a protruding force on the plunger 59 to close port 56, which force increases in proportion to vehicle speed. It will be understood that the fluid spouting from the pressure-modulating port 56 applies a retracting force on the plunger 59. Thus, in operation, the plunger 59 is held in a position where a balance is obtained of an electromagnetic plunger force developed by the solenoid coil 62 and a spring force tending also to urge the plunger 59 with a plunger retracting force exerted by the spouting fluid.

Figure 3:
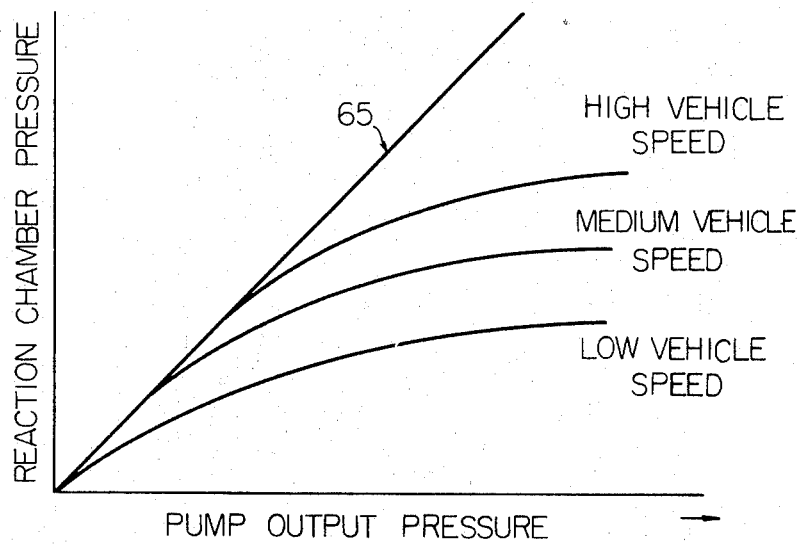
FIGS. 3 and 4 are plots showing typical operating characteristics of the present power steering control device.

FIG. 3 shows a plot of reaction chamber pressure against pump output pressure, where the modulator valve 13 of the poppet type is employed. As will be readily apparent from the plot, the reaction chamber pressure is great for higher vehicle speeds. In the plot, the straight line 65 represents the case where the d.c. current is infinite, which means that the pressure-modulating port 56 is kept totally blocked by the plunger 59, so that the reaction chamber pressure is equal to the pump output pressure.

Figure 4:
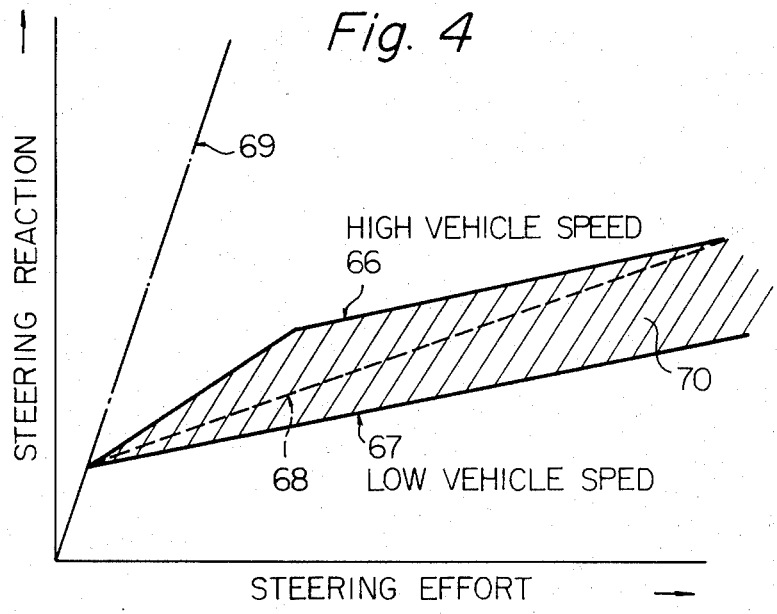

As described above, when the valve spool 28 is moved in one direction or another, the coiled springs 36 are further compressed by either one of the spring seats 24 and 34, as a result, a reaction corresponding to the compressive force of the coiled springs 36 is applied on the steering wheel through the operating rod 40. In addition to this spring compressive force, the hydraulic pressure in the reaction chamber 12 that is proportional to both steering effort and vehicle speed provides a reaction on the steering wheel. Thus, it should be understood that a resistance in turning the steering wheel corresponds in magnitude to the sum of the spring compression force and the hydraulic pressure. With the modulator valve 13 as described, the reaction applied on the steering wheel changes according to steering effort at high and low vehicle speeds as exemplified by solid lines 66 and 67 in FIG. 4. In the plot, the broken line 68 represents the reaction produced by a conventional reaction assembly that is proportional to steering effort, and the dash-and-dot line 69 that encountered with a conventional manual steering device. It is to be understood that the reaction obtainable at low to high vehicle speeds as represented by hatched area 70 can be varied arbitrarily by changing the spring constant of the coiled springs 36 mounted in the reaction chamber 12 and the springs 36 mounted in the reaction chamber 12 and the spring 61 of the plunger 59.

Figure 5:
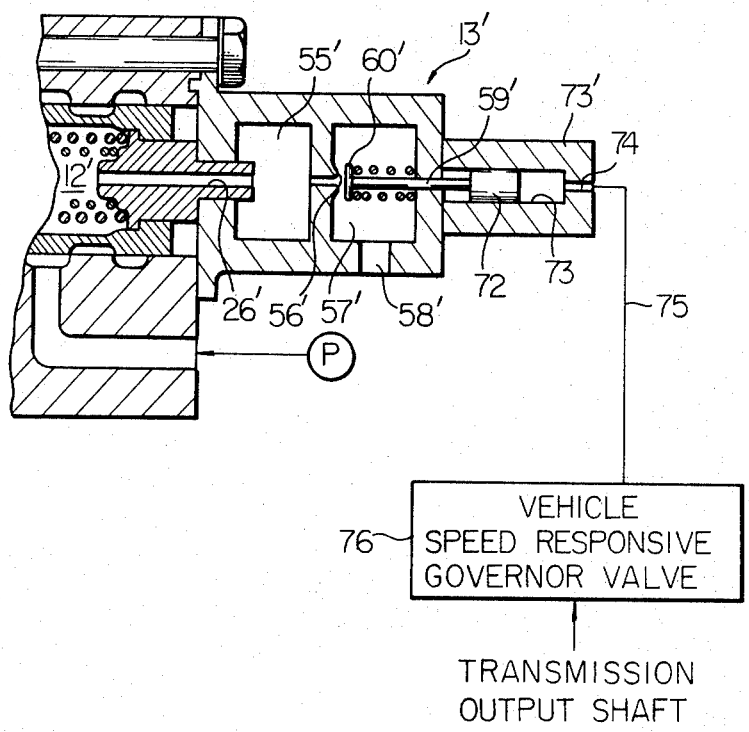
FIG. 5 is a view similar to FIG. 2, but showing another embodiment of the modulator valve.

FIG. 5 illustrates a modification 13' of the modulator valve 13 which is different from that of FIG. 2 in that it is adapted to be controlled by a pressure signal proportional to vehicle speed. As shown, the plunger 59' is secured to a piston 72 which is slidably mounted in a cylinder bore 73 of a casing 73' integrally formed on the modulator valve 13'. The cylinder bore 73 has an inlet port 74 connected by a conduit 75 with a vehicle speed-responsive governor valve 76 which is operatively associated with the transmission output shaft to provide a pressure signal proportional to vehicle speed. Thus, as vehicle speed increases, the plunger 59' is urged accordingly to the left by the pressure signal, tending to close the pressure-modulating port 56', with the resultant increase in the reaction chamber pressure. Other suitable means for producing a pressure signal proportional to vehicle speed may be used.

As has been described above, this invention provides an improved power steering control device for use on vehicles by creating a proper reaction on the steering wheel in dependence on both steering effort and vehicle speed.

What is claimed is:

1. A hydraulic power steering device for use on vehicle comprising a fluid flow and pressure control valve, a valve body having a bore therein, a hollow valve spool slidably disposed in said valve body bore and having a bore therein, said valve spool being operatively associated with the steering wheel, two spring seats slidably disposed in said hollow valve spool and forming a reaction chamber between said seats, each of said spring seats having a flange peripherally formed thereon acting as a stopper, spring means mounted in said reaction chamber between said spring seats, said spring means being so preloaded as to urge said spring seats away from each other, said valve body having a first passage adapted to be connected to a fluid pump and communicating at its outlet end with a first annular groove formed in said valve body bore, said valve body bore having formed a second annular groove and a third annular groove spaced on both sides of said first groove, said second annular groove and said third annular groove being adapted to be connected to a fluid reservoir through a second passage and a third passage, respectively, a power cylinder having a piston and a rod and connected at one end to a fourth passage and the other end to a fifth passage, said valve spool having a fourth annular groove and a fifth annular groove therein adapted to selectively connect said first passage with said fourth passage and said fifth passage, respectively, to control fluid flow through said control valve to said power cylinder in response to movement of said valve spool relative to said valve body in either direction, said valve spool having a sixth passage therein adapted to communicate said first passage with said reaction chamber, and a modulator valve for controlling a pressure in said reaction chamber in response to vehicle speed, wherein the reaction applied on the steering wheel by said control valve corresponds to the sum of the hydraulic pressure in said reaction chamber and the force of said spring means and therefore depends not only upon steering load on said power cylinder but also upon vehicle speed.

2. A hydraulic power steering control device according to claim 1, in which the reaction applied on the steering wheel increases with vehicle speed.

3. A hydraulic power steering control device according to claim 1, in which one of said spring seats has a passage therein through which said reaction chamber is communicated with said modulator valve.

4. A hydraulic power steering control device according to claim 1, in which said modulator valve is fixedly mounted on said control valve.

5. A hydraulic power steering control device according to claim 1, in which said first chamber communicating with said second chamber through an opening, a plunger having its tip portion facing said opening and adapted to throttle the flow of fluid through said opening, a spring around said plunger, and a solenoid operatively associated with said plunger to move said plunger toward said opening in response to d.c. current proportional to said vehicle speed and supplied by a vehicle speed sensor to the coil of said solenoid.

6. A hydraulic power steering control device according to claim 1, in which said modulator valve has a first chamber communicating with said reaction chamber and a second chamber communicating with said fluid reservoir, said first chamber and said second chamber being communicated through an opening, a plunger having its tip portion facing said opening to throttle the flow of fluid through said opening a spring around said plunger, a piston operatively connected to said plunger and slidably mounted in a cylinder, and means for applying a vehicle speed dependent pressure signal into said cylinder to move said piston and hence said plunger.

7. A hydraulic power steering control device according to claim 6, in which said means comprises a vehicle speed-responsive hydraulic governor valve operatively associated with the transmission output shaft so as to produce a pressure signal corresponding to vehicle speed.

* * * * *